June 25, 1968     B. V. LOJKUTZ     3,389,921
SEAL ADAPTED FOR A LINK BELT ASSEMBLY
Filed June 8, 1964
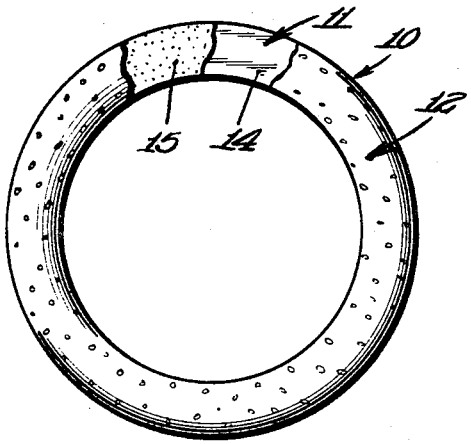
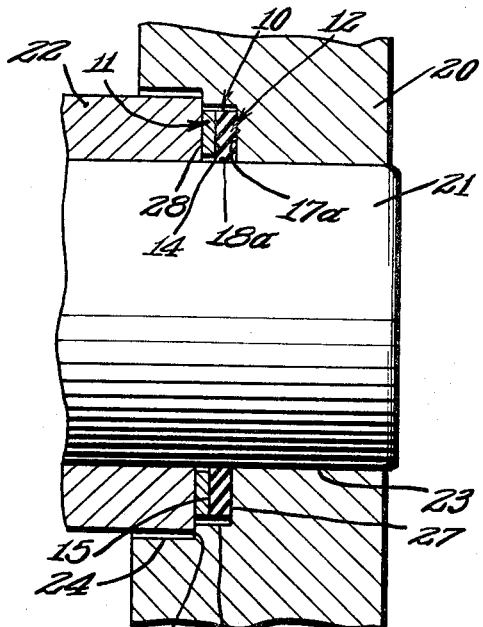
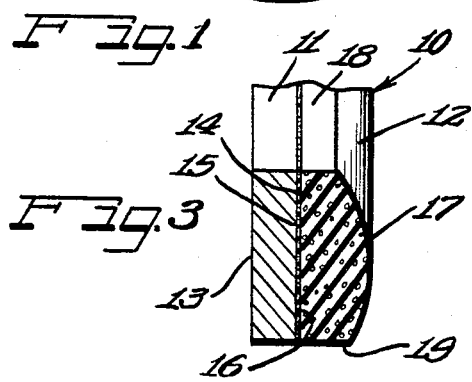
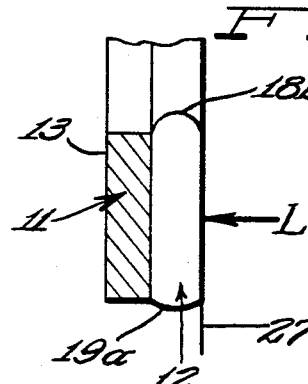
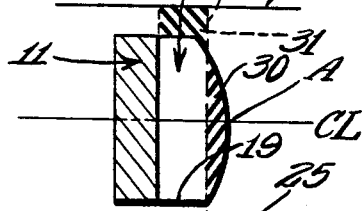
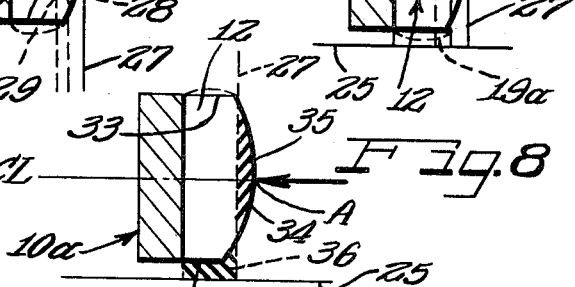
INVENTOR.
Bruno V. Lojkutz
BY     ATTORNEYS

United States Patent Office 3,389,921
Patented June 25, 1968

3,389,921
SEAL ADAPTED FOR A LINK BELT ASSEMBLY
Bruno V. Lojkutz, Chicago, Ill., assignor to Gits Bros.
Mfg. Co., Chicago, Ill., a corporation of Delaware
Filed June 8, 1964, Ser. No. 373,305
4 Claims. (Cl. 277—235)

This invention relates to an inexpensive seal ring having a hard sealing face backed by a resilient deformable ring of such configuration as to assume a deformed shape under axial load which will center the sealing face against the part to be sealed while maintaining good sealing contact between the face and part. Specifically this invention relates to a seal ring composed of a flat hard sealing ring with an exposed smooth sealing face and a rough opposed face integrally bonded to a sponge type rubber ring having a crowned face opposite the bonded face thereof with a crown configuration which when flattened will flow the rubber beyond the inner or outer circumference of the hard ring to provide a mounting periphery for the ring.

According to this invention a hardened metal washer with opposed flat faces has one face lap finished for riding on a part to be sealed and the opposite face roughened to provide a good bonding surface. A soft sponge-type rubber washer has a flat face intimately bonded to the rough face of the metal washer and in its free state has inner and outer cylindrical peripheral walls flush with the inner and outer peripheries of the metal washer. The exposed face of the rubber washer is crowned with its apex about midway between the inner and outer peripheries. However the crown is unequal in that it slopes more acutely to one periphery than to the other thereby leaving the rubber washer with a thick cylindrical periphery at one radial end thereof and a thin cylindrical periphery at the other radial end thereof. The thinner peripheral portion is provided either on the I.D. or the O.D. depending upon whether the assembly is to be centered by a surrounding wall or by an inserted wall. In operation the rubber washer is axially loaded to flatten the crown thereby deforming the rubber into conformity with the loading surface and bulging the narrow or thin peripheral portion beyond the metal washer into seating engagement with the part that mounts the assembly. The metal washer is thereby centered on this part and the deformed extension of the rubber washer provides a further seal surface.

In the preferred embodiment the crown of the rubber washer is shaped so that the I.D. of the washer is thinner than the O.D. whereupon the axial loading of the washer will bulge the same inwardly of the metal washer onto a part extending through the seal assembly. The deformed rubber washer will urge the sealing face of the metal washer against the part to be sealed, will center this face on the part and will provide a secondary seal around the inserted part.

The seals of this invention are especially adapted as dirt seals for tractor link belts where the track segments provide the axial load on the rubber washer for keeping the sealing face of the metal washer in contact with the end of the track bushing while also deforming the rubber washer radially inward into seated engagement on the track pin projecting beyond the bushing. It will be appreciated however that the seals of this invention are adapted for many other uses.

It is then an object of this invention to provide an inexpensive seal composed of a resilient ring and a hard seal ring dimensioned and contoured for deformation of the rubber ring beyond the hard ring when subjected to axial loads.

Another object of this invention is to provide a simplified dirt seal or the like composed of a metal ring backed by a deformable ring having a crowned face deformed under axial load for increasing the radial depth thereof while urging the metal ring into good sealing contact with the part to be sealed.

A still further object of this invention is to provide a dirt seal or the like composed of a metal washer having a smooth flat sealing face and an opposite roughened face integrally bonded to a rubber ring which is shaped to flow radially inward when axially loaded for carrying the metal washer around a part to be sealed.

A specific object of this invention is to provide a dirt seal for tractor link belts and the like which is composed of a hard metal washer having a lapped sealing face for sealing contact with a bushing and backed by a sponge type soft rubber ring cemented on the opposite face thereof and shaped to be deformed to an increased radial depth when subjected to axial loads which reduce the thickness of the assembly.

Other and further objects of this invention will be apparent to those skilled in this art from the following detailed description of the annexed sheet of drawings which, by way of preferred examples only, illustrates two embodiments of the invention.

On the drawings:

FIGURE 1 is a plan view of the seal of this invention with parts broken away to show underlying parts.

FIGURE 2 is a fragmentary cross sectional view, with parts in elevation, showing the seal of this invention mounted in a tractor link belt assembly for sealing the track bushing.

FIGURE 3 is an enlarged fragmentary cross sectional view of the seal assembly of FIGS. 1 and 2 showing the free state condition of the components.

FIGURE 4 is a view similar to FIG. 3 but showing the deformed state of the rubber washer component of the seal assembly when subjected to axial loads.

FIGURE 5 is a somewhat schematic cross sectional view of the seal assembly showing the progressive deformation of the rubber washer.

FIGURE 6 is a view similar to FIG. 5 but illustrating the deformed position assumed by the rubber washer when axially loaded around an inserted member.

FIGURE 7 is a diagrammatic cross sectional view of the seal assembly disposed around an inserted member and illustrating the displacement of the rubber when moved from its free state condition to its deformed seated position around the inserted member.

FIGURE 8 is a view similar to FIG. 7 but illustrating an alternate seal arrangement of this invention having the rubber washer shaped for deformation into seal engagement on a surrounding part.

As shown on the drawings:

The seal assembly 10 of FIG. 1 is composed of a flat hard metal washer 11 backed by a rubber washer 12. The metal washer 11 is preferably composed of hardened steel and is thick enough to be sufficiently rigid to avoid deformation. Preferably the metal washer 11 has a radial depth which is several times, preferably more than three, the axial thickness thereof.

The rubber washer 12 is relatively soft and of the sponge rubber type. Oil resistant Buna N soft durometer rubber is preferred. The radial depth of the rubber ring 12 in its free state is the same as the radial depth of the metal ring 11.

As shown in FIG. 2 the metal washer 11 has a flat exposed face 13 which is lapped or otherwise finished to provide a smooth surface thereon. The opposite face 14 of the metal washer is rough and is bonded by a cement bond 15 or the like to a mating face 16 of the rubber washer 12. The exposed face 17 of the rubber washer is crowned with the crown apex midway between the free state inner and outer peripheries of the rubber ring. However the crowns slope more acutely from the apex to the inner periphery of the ring than to the outer periphery so that the free state height or thickness of the inner periphery 18 of the ring is much less than the corresponding dimension of the outer periphery 19. It will be noted however that both the inner periphery 18 and the outer periphery 19 of the washer 12 in their free state conditions are flush with the cylindrical inner and outer peripheries of the metal washer 11.

As shown in FIG. 2 the seal 10 of this invention is installed in a track segment of a tractor link belt including a track segment 20, a pin 21 and a bushing 22. The track segment 20 has a bore 23 receiving the pin 21 and the inboard end of this bore 23 has a counterbore 24 receiving the end of the bushing 22. A smaller counterbore 25 extends from the bottom of the counterbore 24 to the bore 23 thereby providing first and second shoulders 26 and 27 in the bore 23. The bushing 22 has an end face 28 bottomed on the shoulder 26 and the seal assembly 10 of this invention is mounted in the counterbore 25 with the crowned face of the rubber washer 12 bottomed on the shoulder 27 and the lapped face of the hard metal washer 11 riding on the end wall 28 of the bushing. The depth of the counterbore 25 is less than the free state thickness of the seal assembly 10 so that the rubber washer 12 is deformed into generally rectangular cross sectional shape as shown with the inner periphery 18 thereof deformed as at 18a inwardly beyond the inner periphery of the metal washer 13 into seated and sealed engagement on the pin 21 and with the crown face 17 thereof deformed as at 17a into flat mating engagement with the shoulder 27.

FIG. 4 illustrates the manner in which the application of an axial load L on the seal assembly 10 through an end wall such as the shoulder 27 will deform the rubber washer 12 and cause the same to flow radially inward at 18b beyond the inner periphery of the metal washer 11. The contour of the crown 17 of the rubber washer 12 is such that the axial load on the crown surface will cause the radially inward flow of the rubber to form the bulge 18b with a very little bulge being formed at 19a beyond the outer periphery of the washer 11 so that this outer periphery remains substantially flush with the metal washer.

FIG. 5 attempts to diagrammatically illustrate the flow of the rubber from the free state crown 17 under axial load L applied by the shoulder 27 through intermediate stages illustrated at 28 and 29 with the rubber flowing progressively radially inward as the crown 17 is flattened by the shoulder 27. The outward flow of the crown is very small and the O.D. 19 of the rubber ring 12 maintains substantially its original shape.

As illustrated in FIG. 6 when the I.D. of the rubber ring 12 is confined by an inserted wall such as the pin 21 the progressive inward flow illustrated at 28 and 29 is arrested by surface 21 to form the flat extended inner periphery 18a on the rubber ring as described in connection with FIG. 3. At the same time the outward flow of the rubber from the crown only forms a slow bulge 19a. The bulge 19a is of sufficiently small extent so that it does not fill the counterbore 25.

FIG. 7 illustrates wherein the apex A of the crown face 17 of the rubber ring 12 is on the center line CL of the ring midway between the inner and outer peripheries thereof. When this free stage crown 17 is flattened by the shoulder 27 that portion of the rubber designated by the area 30 in the crown is transferred to the area 31 inwardly of the inner periphery of the rubber ring 12. Thus the flattening of the crown flows the rubber from the area 30 into conformity with the pin surface 21 and beyond the metal washer 11 to mount the washer on the pin and to sealingly engage the pin. The deformation of the crown does not materially affect the thickness dimension of the outer periphery 19 of the rubber ring as shown. The inward flow from 30 to 31 is induced by the shape of the crown 17 and by the increased thickness or axial height of the outer periphery 19 over the height or thickness of the inner periphery 18. This configuration facilitates the inward flow of the rubber against the outward bulging that might take place if the crown had an even contour and the I.D. and the O.D. were of the same thickness.

If it is desired to mount or center the metal seal washer 11 from a surrounding part such as the counterbore 25 instead of on an inserted part such as the pin 21, a modified seal assembly 10a can be provided wherein the rubber washer 12 has an outer cylindrical periphery 32 of less thickness or height than the inner cylindrical periphery 33 and with the apex A of a crown 34 lying on the same center line as the crown 17 but with a contour sloping more acutely from the apex to the thinner peripheral wall 32 than to the thicker outer peripheral wall 33. In such an arrangement when the shoulder 27 flattens the crown 34 that portion of the rubber lying in the area 35 of the crown will flow outwardly to form the projection 36 bottomed on the counterbore 25 and thereby centering the ring 11 from the counterbore while sealingly engaging the rubber washer on the counterbore wall.

In operation of a tractor link assembly as shown in FIG. 3 the metal washer 11 rides on the end face 28 of the bushing 22 while the rubber washer 12 is loaded in the counterbore 25 to hold the lapped face 13 of the ring in good sealing contact with the bushing end wall 28. The loaded rubber ring 12 is deformed from its crowned free state position into conformity with the shoulder 27 of the counterbore 25 and with the surface of the inserted pin 21. The deformed crown thus frictionally grips both the pin 21 and the link segment 20 to fixedly carry the washer 12 in the counterbore 25. Oscillation of the link 20 relative to the bushing 22 will thereby cause the washer 11 to ride over the end face 28 of the bushing without impeding the relative movement of the two parts. At the same time the seal assembly is effective to seal out dirt from the bushing.

From the above descriptions it will be understood that the seals of this invention are composed of a rigid washer and an elastomeric backing washer bonded thereto and having a crown configuration such as to accommodate controlled deformation under axial load for centering the rigid washer in position while holding it against the part to be sealed.

I claim as my invention:

1. A seal ring which comprises, a flat metal washer ring having a smooth sealing face adapted to ride on a part to be sealed, an elastomeric ring bonded to the opposite face of said washer ring, said elastomeric ring in its free state having inner and outer peripheries substantially flush with the inner and outer peripheries of said washer ring, said elastomeric ring having a crowned exposed face contoured to slope more acutely from its apex to one of said peripheries than to the other of said peripheries, said one of said peripheries being axially thinner than the other of said peripheries, and said elastomeric ring when flattened under axial load having the periphery at the terminal end of the acute sloping crowned face portion extended beyond the metal washer ring, said extended periphery being adapted to seat on an adjacent member to carry the metal washer ring while the flattened elastomeric ring urges the metal washer ring against a part to be sealed.

2. A seal assembly which comprises, a hard flat metal washer ring having a radial depth more than twice the thickness thereof, a smooth sealing face on one side of said washer ring, a rough face on the opposite side of said washer ring, an elastomeric washer ring bonded to said rough face with its inner and outer peripheries substantially flush with the periphery of the metal washer ring, said elastomeric washer ring having a crown on the exposed face thereof with an apex about midway between the radial depth of the metal washer ring and contoured to slope more acutely from said apex to one of said peripheries than to the other of said peripheries, said one of said peripheries being axially thinner than the other of said peripheries, and said crown when flattened under axial load flowing material from the crown area to said one periphery for projecting beyond the metal washer ring to provide a mounting seat for said metal washer ring.

3. A seal assembly adapted for tractor link belts and the like having a link segment receiving a pin and a counterbore receiving a bushing on the pin together with a second counterbore of smaller diameter than the first counterbore beyond the end face of the bushing which comprises a rigid metal ring adapted to ride on the end face of the bushing, a rubber ring bonded to said rigid metal ring and extending in its free state substantially flush with the inner and outer peripheries of the metal ring, and a crowned exposed face on said rubber ring with the crown apex about midway between the inner and outer peripheries of the rubber ring and with the crown sloping more acutely from the apex to one periphery than from the apex to the other periphery, said one periphery being axially thinner than said other periphery, and said crowned exposed face adapted to be flattened to extend said one periphery of the rubber ring beyond the metal ring, and the free state thickness of the seal assembly being greater than the depth of the second counterbore whereby the rubber ring will be flattened in the second counterbore while urging the metal ring against the end face of the bushing.

4. The seal ring of claim 1, wherein the crown slopes more acutely from the apex to the outer periphery than to the inner periphery, and when deformed flows material beyond the outer periphery of the metal washer to provide a mounting area for the metal washer.

References Cited

UNITED STATES PATENTS

| 2,285,870 | 6/1942 | Parker | 277—188 |
| 3,206,258 | 9/1965 | Heinrich | 305—11 |
| 3,221,758 | 12/1965 | Morse | 277—188 X |

FOREIGN PATENTS 664,940  1/1952  Great Britain.

LAVERNE D. GEIGER, *Primary Examiner.*

J. S. MEDNICK, *Assistant Examiner.*